(12) United States Patent
DePetris et al.

(10) Patent No.: US 7,612,474 B2
(45) Date of Patent: Nov. 3, 2009

(54) RECTIFIER ASSEMBLY WITH ENHANCED AIR COOLING

(75) Inventors: Peter Salvatore DePetris, Niagara Falls, NY (US); Timothy Christopher DePetris, Niagara Falls, NY (US)

(73) Assignee: Electric-Dyn Choke Corporation, Niagara Falls, NY (US)

( * ) Notice: Subject to any disclaimer, the term of this patent is extended or adjusted under 35 U.S.C. 154(b) by 371 days.

(21) Appl. No.: 11/314,784

(22) Filed: Dec. 21, 2005

(65) Prior Publication Data

US 2006/0131969 A1   Jun. 22, 2006

Related U.S. Application Data

(60) Provisional application No. 60/637,921, filed on Dec. 21, 2004.

(51) Int. Cl.
*H02K 11/04* (2006.01)
(52) U.S. Cl. .................. 310/68 D; 310/71; 310/64
(58) Field of Classification Search ............... 310/68 D, 310/71, 68 R, 64
See application file for complete search history.

(56) References Cited

U.S. PATENT DOCUMENTS

| | | | | |
|---|---|---|---|---|
| 4,799,309 | A | * | 1/1989 | Cinzori et al. ............... 29/596 |
| 4,952,829 | A | * | 8/1990 | Armbruster et al. ....... 310/68 D |
| 5,043,614 | A | * | 8/1991 | Yockey ..................... 310/68 D |
| 5,392,506 | A | | 2/1995 | Luciani et al. |
| 5,451,823 | A | * | 9/1995 | Deverall et al. .......... 310/68 D |
| 5,659,212 | A | | 8/1997 | DePetris |
| 6,121,699 | A | * | 9/2000 | Kashihara et al. ........ 310/68 D |
| 6,327,128 | B1 | | 12/2001 | DePetris |
| 6,528,911 | B1 | | 3/2003 | DePetris |
| 6,621,703 | B2 | | 9/2003 | DePetris |
| 2002/0042218 | A1 | | 4/2002 | DePetris |
| 2004/0092147 | A1 | | 5/2004 | DePetris |
| 2004/0263007 | A1 | | 12/2004 | Malanga et al. |
| 2005/0127763 | A1 | | 6/2005 | Fischer et al. |

OTHER PUBLICATIONS

Electro-Dyn Electronics Brochure, dated at least as early as Dec. 21, 2005.

\* cited by examiner

*Primary Examiner*—Thanh Lam
(74) *Attorney, Agent, or Firm*—Dominic P. Ciminello, Esq.; Brian B. Shaw, Esq.; Harter Secrest & Emery LLP (57) ABSTRACT

An alternator rectifier assembly includes a rigid load bearing bushing intermediate a stator terminal board and a positive heat sink, wherein a minimum separation distance between the stator terminal board and the positive heat sink is defined by the bushing. The rectifier assembly further includes plurality of radiator connectors electrically connecting diode leads, wherein the radiator connectors are at least partially spaced from a top surface of the stator terminal board. The rectifier assembly further contemplates a stator terminal board frame, wherein terminals are located on the top surface of the stator terminal board, and the stator terminal board includes at least one cut out.

14 Claims, 8 Drawing Sheets

RECTIFIER ASSEMBLY WITH ENHANCED AIR COOLING

CROSS-REFERENCE TO RELATED APPLICATIONS

The present application claims priority to U.S. Ser. No. 60/637,921, filed Dec. 21, 2004 and is hereby incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention generally relates to automotive rectifier assemblies, and more particularly, to a method and apparatus for reducing the operating temperature of an automotive rectifier assembly. In a specific construction, the present invention relates to an automotive rectifier assembly for converting a polyphase alternating current to direct current by means of silicon semiconductor diodes.

2. Description of Related Art

Automotive alternator design has followed the trend in automotive manufacturing of decreasing manufacturing costs, air pollution and weight. Although alternators have become smaller, the electrical energy output requirements have increased. Compact alternators can often not dissipate heat out of the rectifier bridge fast enough to prevent semiconductor failures. This is particularly true during the summer months when the ambient temperatures are relatively high, providing reduced heat transfer resulting in a higher alternator failure rate, often attributed to semiconductor failure.

Generally, recharging an automobile battery requires a current between 40 and 50 amperes. Combined with the energy requirements of the air conditioning system, computer modules, a car radio, fans, and lighting systems, the overall current consumption can exceed 150 amperes.

Once an alternator is installed in a vehicle, all semiconductor diodes are electrically connected to the battery, completing a number of potential short circuit paths to the ground. The wiring harness of the charging system usually incorporates a 12 AWG fuse link safety circuit, for fire and meltdown protection.

Heat and voltage transients degenerate semiconductor switches and cause undesired reverse current leakage through the semiconductor junction. The leakage can lead to excessive junction heating. Once overheated, the semiconductor switch may be damaged beyond recovery. The semiconductor switch can also lose its blocking characteristics and allow current to flow in both directions. The excessive heat can then cascade into and damage other semiconductor switches of the same circuit.

Generally, there are no cut out relays or switches that open the semiconductor circuits of the rectifier system when a vehicle is shut down. Therefore, the circuits usually remain electrically "HOT" when the vehicle is shut down. Further, the alternator cooling system is also shut down when a vehicle is not operating, thus leaving the circuits thermally vulnerable. Latent heat remains in the thick rectifier housing and conducts back into the semiconductors. Thus, the alternator of the unattended shut-down vehicle is slowly heating up, as heat cascades from one semiconductor to another, causing semiconductor failures, and generating enough heat so as to potentially ignite an under-the-hood fire.

When the semiconductors fail, the current level is generally not high enough to melt the 12 AWG fuse. The semiconductors usually fail with a combined resistance of approximately 0.3 ohm. Thus, a 40 ampere current flows through the failed circuit. The level of current translates to 480 watts generated within the rectifier case. The 480-watt power output is approximately 13 times greater than an average 37 watt soldering iron used in the electronics industry.

The failed semiconductors become high wattage heaters (controlled by the resistance of the hot silicon), overheating the path through the copper components, melting the plastic affixing the terminals, melting the epoxy fillers, and igniting any grease or oil on the wiring harness insulation. Furthermore, the leakage path does not conduct enough current to melt the 12 AWG fuse link. Therefore, there is only an appearance of safety when employing the fuse link. Once started, the meltdown continues until the battery is discharged or manually disconnected. Rectifiers that fail without a catastrophic failure are still a nuisance to the general public because of the required service calls, the towing, and the repair costs.

Therefore, there is a need for dissipating heat from a rectifier assembly to reduce semiconductor failure. The need also exists for a rectifier assembly that is manufactured without overstressing the semiconductors. The need further exists for a rectifier assembly can dissipate sufficient heat to reduce system failure, and particularly semiconductor failure, without sacrificing mechanical robustness of the system or increasing the size and cost of the assembly.

BRIEF SUMMARY OF THE INVENTION

The present construction provides for enhanced heat transfer from a rectifier assembly, while allowing for a mechanically robust construction.

In one configuration, an alternator rectifier assembly has a stator terminal board including a top surface and a bottom surface, wherein a plurality of a first and a second diode leads extend through the stator terminal board to terminate at a distance spaced from the top surface, and a radiator connector electrically connects at least two diode leads above the top surface of the stator terminal board. It is contemplated the radiator connector is metal and either adjacent or spaced from the top surface of the stator terminal board.

In a further configuration, the alternator rectifier assembly contemplates a stator terminal board having a top surface, a bottom surface and a through aperture having a stop spaced from the bottom surface, a positive heat sink spaced from the bottom surface of the stator terminal board; and a bushing within the through aperture and contacting the stop, the bushing projecting from the stator terminal board a sufficient distance to preclude local load bearing contact between the bottom surface of the stator terminal board and the positive heat sink. In one configuration, the stator terminal board can include an embedded conductor electrically connected to the bushing.

A further configuration of the alternator rectifier assembly includes a stator terminal board having a top surface, a bottom surface and an embedded conductor intermediate the top surface and the bottom surface, and a socket extending from the bottom surface to the embedded conductor; a heat sink spaced from the bottom surface of the stator terminal board;

and a bushing within the socket and electrically connecting the embedded conductor to the heat sink, the bushing projecting from the socket a sufficient distance to preclude local load bearing contact between the bottom surface of the stator terminal board and the heat sink.

The alternator rectifier assembly also contemplates a stator terminal board having an embedded conductor; a positive heat sink spaced from the stator terminal board; and a bushing intermediate the positive heat sink and the stator terminal board, the bushing forming an electrical path between the embedded conductor and the positive heat sink, the bushing defining a minimum local spacing between the stator terminal board and the positive heat sink.

An alternative configuration of the alternator rectifier assembly includes a stator terminal board having a top surface, a bottom surface, a plurality of diode lead receiving apertures extending from the bottom surface to the top surface and at least one cut out; a plurality of electrically conductive terminals connected to the top surface of the stator terminal board; a positive heat sink spaced from the stator terminal board; and a bushing intermediate the positive heat sink and the stator terminal board, the bushing forming an electrical path between the embedded conductor and the positive heat sink, the bushing defining a minimum spacing between the stator terminal board and the positive heat sink.

DETAILED DESCRIPTION OF THE INVENTION

Power for many electrical components in an automobile are provided by converting polyphase alternating current to direct current by conducting the current through semiconductor diodes in a rectifier circuit as illustrated by U.S. Pat. Nos. 5,043,614 and 5,712,517, which are incorporated by reference herein. A representative rectifier bridge is shown and described in U.S. Pat. Nos. 6,327,128 and 6,528,911 hereby expressly incorporated by reference. The semiconductors can be affixed directly onto a heat sink, as is illustrated by U.S. Pat. No. 5,005,069, or press-fit into pre-punched holes in the heat sinks, as is illustrated by U.S. Pat. No. 5,043,614. In other methods, such as that illustrated in U.S. Pat. No. 4,799,309 incorporated herein by reference, the semiconductors are affixed onto integrated heat sinks.

However, such semiconductors are very sensitive to heat, stress and mechanical forces. In particular, the silicon semiconductor diodes are extremely fragile, being only 0.180×0.180×0.007 inches thick (the thickness of three human hairs), making the diodes sensitive to the pressure, stress and heat, which are all required to press the diodes into the rectifier assembly.

Generally, the press-fit rectifier assembly incorporates two heat sinks, one usually being a positive aluminum heat sink, the other being the negative die-case aluminum rear alternator housing. The heat sinks are separated by a heat conductive, electrical insulator gasket or a ceramic coating on the housing, which is a very expensive process. Both of the heat sinks have prepunched or machined holes for at least three press-fit semiconductors (diodes). The cathodes of the first three are pressed into the positive heat sink, and the anodes of the other three are pressed into the negative heat sink. In one configuration of the stator terminal board, at least three stator terminals, stamped out of a conductor such as copper, are encapsulated into a plastic material to form the stator terminal board. Each terminal has two locating holes to affix a positive set and a negative semiconductor lead in series, along with a slot, which connects a stator field lead (from a field winding) between them.

For example, the first stator terminal connects the anode lead from the first positive semiconductor (diode) to the cathode of the first negative semiconductor (diode), thereby forming a first set of series connected semiconductors (diodes) between the two heat sinks. The lead from the polyphase field winding of the alternator is affixed into the slot, which connects field winding between the series diodes. The next two sets of semiconductors are similarly connected to the second and third sets field windings, completing the polyphase field circuits. A lead for the voltage regulator is also affixed between the third set of semiconductors. A B+ terminal, such as a stud, is affixed to the positive heat sink to complete the B+ circuit to the positive post of the battery. Likewise, the negative heat sink completes the charging system circuit to the negative post when the alternator is installed.

The present rectifier assembly can use press-fit or soldered semiconductors. That is, the present construction provides sufficient heat dissipation to accommodate solder connection without undue failure. The compression, torque and thermal shock specifications of the diodes are not exceeded by installation processes, and the heat dissipation of the present design maintains the necessary thermal conditions. Thus, the useful life of the diode is extended as the diode is allowed to operate at a lower temperature.

Figure 1:
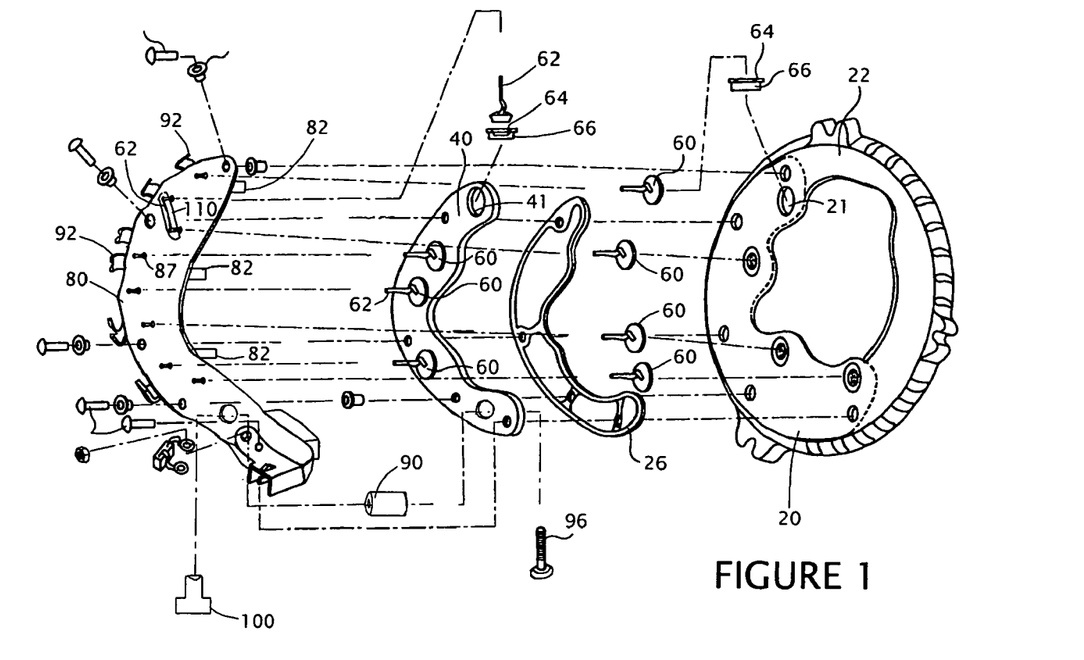
FIG. 1 is an exploded view of a rectifier assembly.
Figure 2:
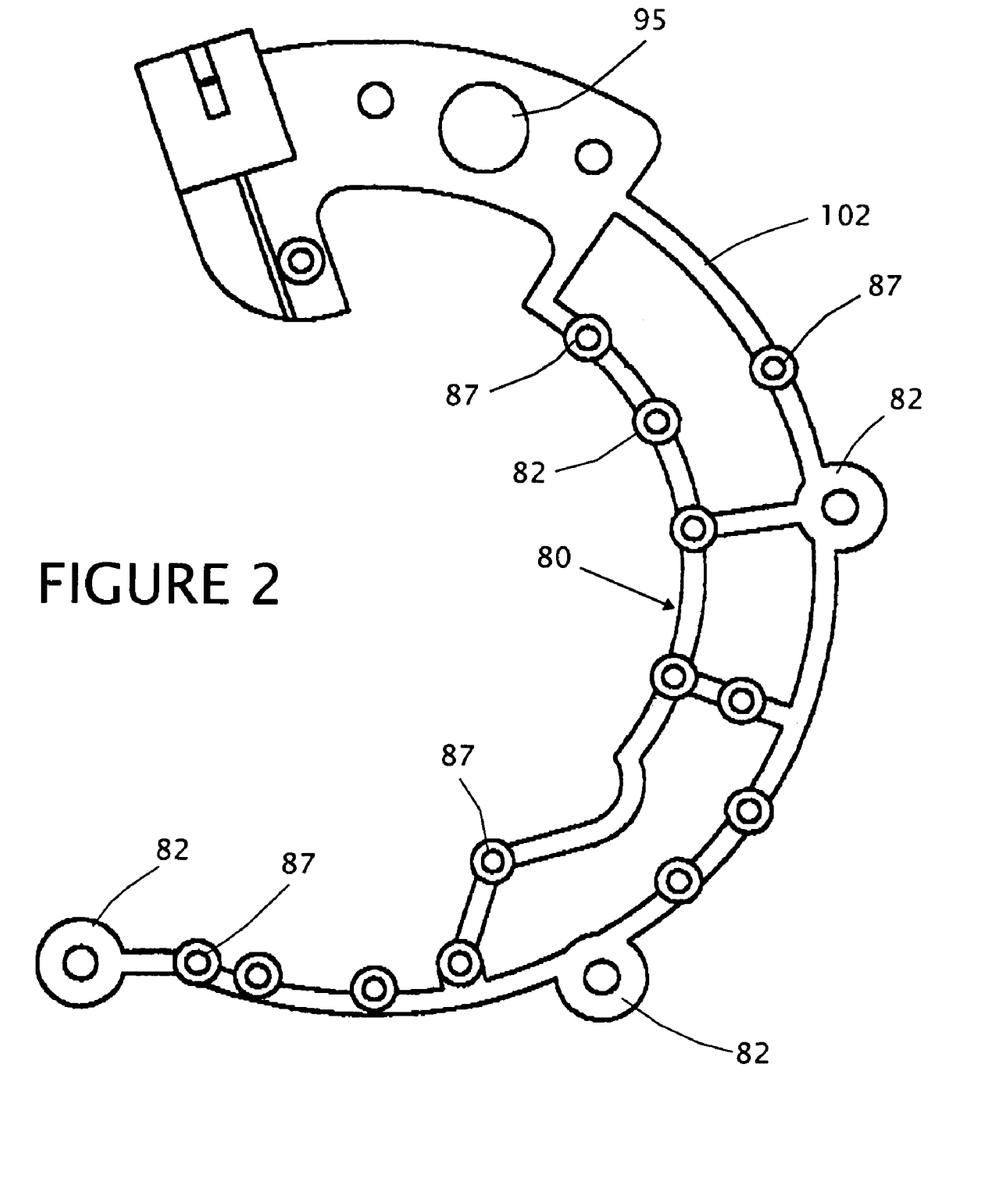
FIG. 2 is a plan view of a skeleton configuration of a stator terminal board with the terminals removed.

Referring to FIG. 1, a specific configuration of the rectifier assembly 10 is shown, wherein a negative heat sink 20 is formed by a portion of the alternator housing, such as the rear housing 22, and a positive heat sink 40 is formed by a separate metal block. Each heat sink 20,40 includes apertures 21, 41 for receiving semiconductors (diodes) 60, such as a button or pan type semiconductor directly pressed into the aperture 21,41 or through an intermediate cavity nest 64. In the configuration employing the cavity nests 64, the nests can be formed of tapered copper slugs 66, wherein the slugs define the cavity nests and a peripheral shoulder. The slugs 66 are pressed into the preformed holes 21,41 in the respective heat sinks 20, 40.

The alternator housing 22 is typically formed of aluminum. However, it is understood the housing 22 can be formed of any of a variety of materials. The positive heat sink 40 can be metal or alloy including but not limited to copper or aluminum. For example, the positive heat sink 40 can be a plated copper, such as tin plated or bare copper. A satisfactory material has been found to be anodized aluminum. However, it is recognized that bare aluminum could be used.

In fabrication employing the cavity nests 64, solder paste is dispensed into each of the nests on both heat sinks 20, 40, and the pan type semiconductor assemblies 60 are placed into the respective nests (according to polarity), and both sinks are passed through a re-flow soldering furnace and allowed to cool down slowly to avoid thermal shock to the semiconductors. This process affixes the semiconductors 60 to the respective heat sink 20, 40. Alternatively, the diodes 60 can be directly press fit into the respective aperture 21, 41 in the given heat sink 20, 40.

In assembling the rectifier assembly 10, the die-cast alternator (rear) housing 22 is placed onto disappearing anvil pins of a riveting machine (not shown). The disappearing anvil pins extend up through the rivet holes to align the housing. A thin coating of thermal compound is applied onto the heat sink area of the rear housing 22 prior to placing the positive heat sink 40 on the rear housing. A thermal gasket 26 is then placed on top of the housing 22 using the anvil pins for alignment. A heat transfer compound is then dispensed into the open areas of the gasket 26. The positive heat sink 40 is then positioned onto the gasket 26, along with the insulator stand-off bushings (if used). However, as discussed below, a stator terminal board 80 can be formed with integral insulator stand-offs 82 (or insulator stand offs can be molded or fused to the stator terminal board), thereby obviating the need for separate stand-off bushings.

The stator terminal board 80 is then engaged with the heat sinks 20, 40 and associated diodes 60. The stator terminal board 80 can be generally described as a circuit board with an associated conductive layer or areas 84. The stator terminal board 80 has a top surface 86, a bottom surface 88 and a plurality of through diode lead holes or diode lead apertures extending from the top surface to the bottom surface. In one configuration, the conductive layer or areas 84 are embedded with the stator terminal board 80, wherein the conductive layer is operably located with respect to a particular lead aperture 87 in the stator terminal board. In the configuration employing the embedded conductors 84, the embedded conductor forms or is electrically connected to a field winding terminal 92 and extends to make electrical contact at a respective lead aperture 87. As described herein and seen in FIGS. 2-5, the stator terminal board 80 can also be in a skeleton configuration, wherein terminals 94 are separate from the board and fastened to the top surface 86 of the board. In this construction, the terminals 94 provide the electrical connection between the respect diode leads 87 and the field winding terminal 92.

Figure 6:
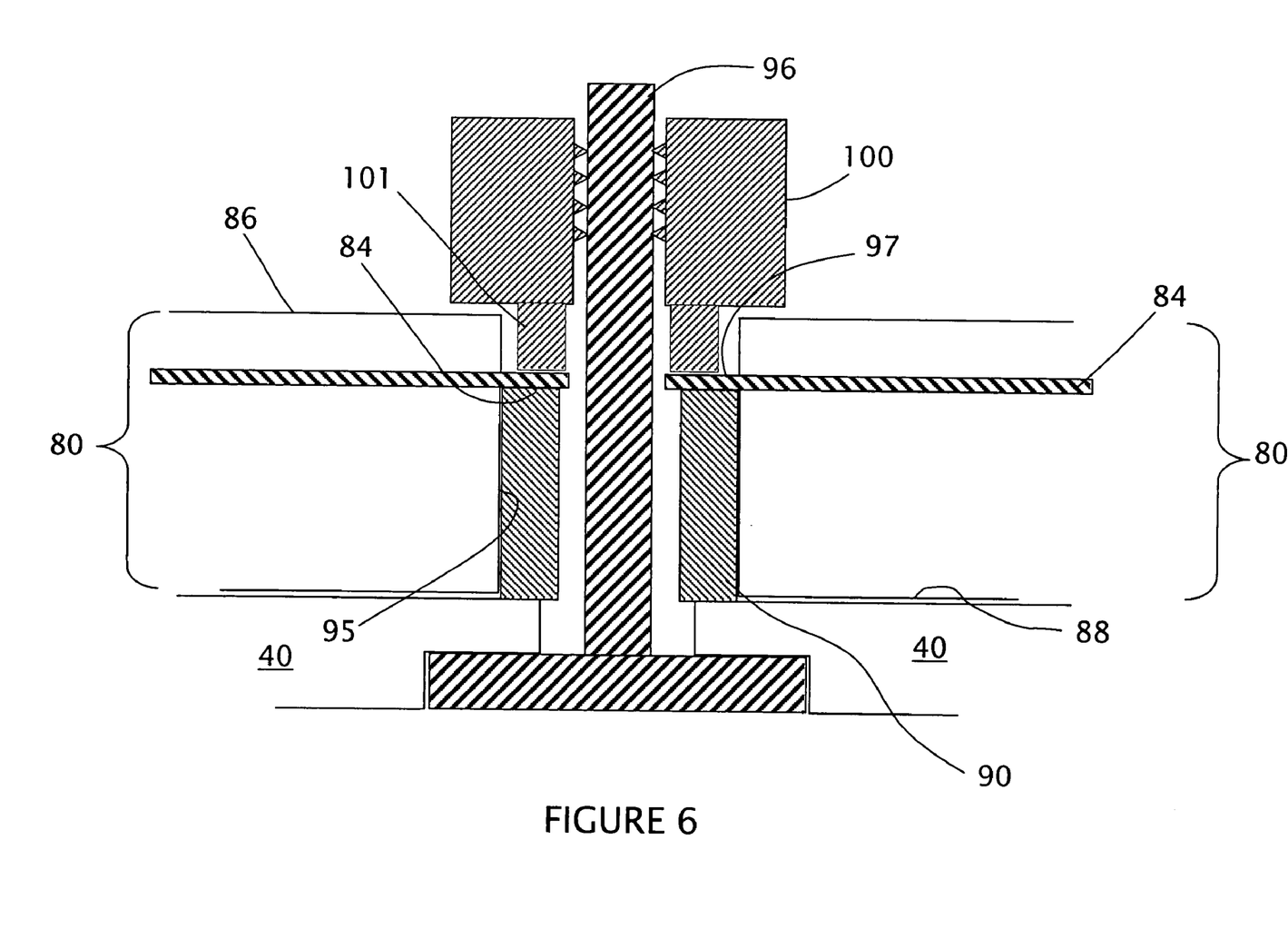
FIG. 6 is a schematic of the B+ stud intermediate a heat sink and the stator terminal board.

As seen in FIG. 6, in either configuration of the stator terminal board 80, the stator terminal board includes a stud aperture 95 sized to receive a length of a B+ stud 96. The stud aperture 95 includes a stop 98, such as an annular shoulder. The stop 98 can be formed by a portion of the penetrated conductive area and overlaying material of the stator terminal board 80. In the skeleton configuration of the stator terminal board 80 for example, without an incorporated of an embedded conductor, the stop 98 is not employed. However, in those configurations employing the stop 98, it is understood the stop 98 can be tab projecting into the stud aperture 95. In one configuration as seen in FIG. 6, the upper surface of the stator terminal board includes a circular seat 97 concentric with the stud aperture 95. The circular seat 97 can be generally collinear with the stop 98.

The stator terminal board 80 includes integral stand offs 82 to partially define the spacing of the stator terminal board from the positive heat sink 40. The number and location of the stand offs 82 are at least partially determined by design considerations. Preferably, the stator terminal board 80 includes at least three stand offs 82. The stand offs 82 extend a given distance from the adjacent surface of the stator terminal board 80. At least one stand off 82 is sized and constructed to provide the stud aperture 95 for receiving a length of the B+ stud 96. Although non conducting bushings can also be used to space the stator terminal board 80 from the positive heat sink 40, it is contemplated the integral stand offs 82 can be located and sized to preclude the need for the incorporation of separate bushings, thereby reducing manufacturing expenses.

Referring to FIG. 6, a rigid bushing 90 is disposed within the stud aperture 95. The bushing 90 seats against the stop shoulder 98 within the stud aperture 95. The bushing 90 is sized to extend slightly beyond the stator terminal board 80. That is, the bushing 90 does not seat entirely within the stud aperture 95. The seated bushing 90 can extend beyond the stand off 82 of the stator terminal board 80 by as little as 0.002 to 0.005 inches, to as much as a $\frac{1}{16}^{th}$ to an $\frac{1}{8}^{th}$ of an inch.

In one configuration, the bushing 90 is metallic, such as steel, aluminum, brass or copper. A satisfactory material for the bushing 90 has been found to be brass. It is advantageous to form the bushing 90 to be both electrically and thermally conductive, and hence brass has been found satisfactory.

As known in the art, the B+ stud 96 has a general bolt shape, including a head and a projecting threaded portion. The head of the B+ stud is received within a recess 43 on the underside of the positive heat sink 40. The threaded portion extends through the stud aperture 95 to terminate above the top surface 86 of the stator terminal board 80.

Figure 7:
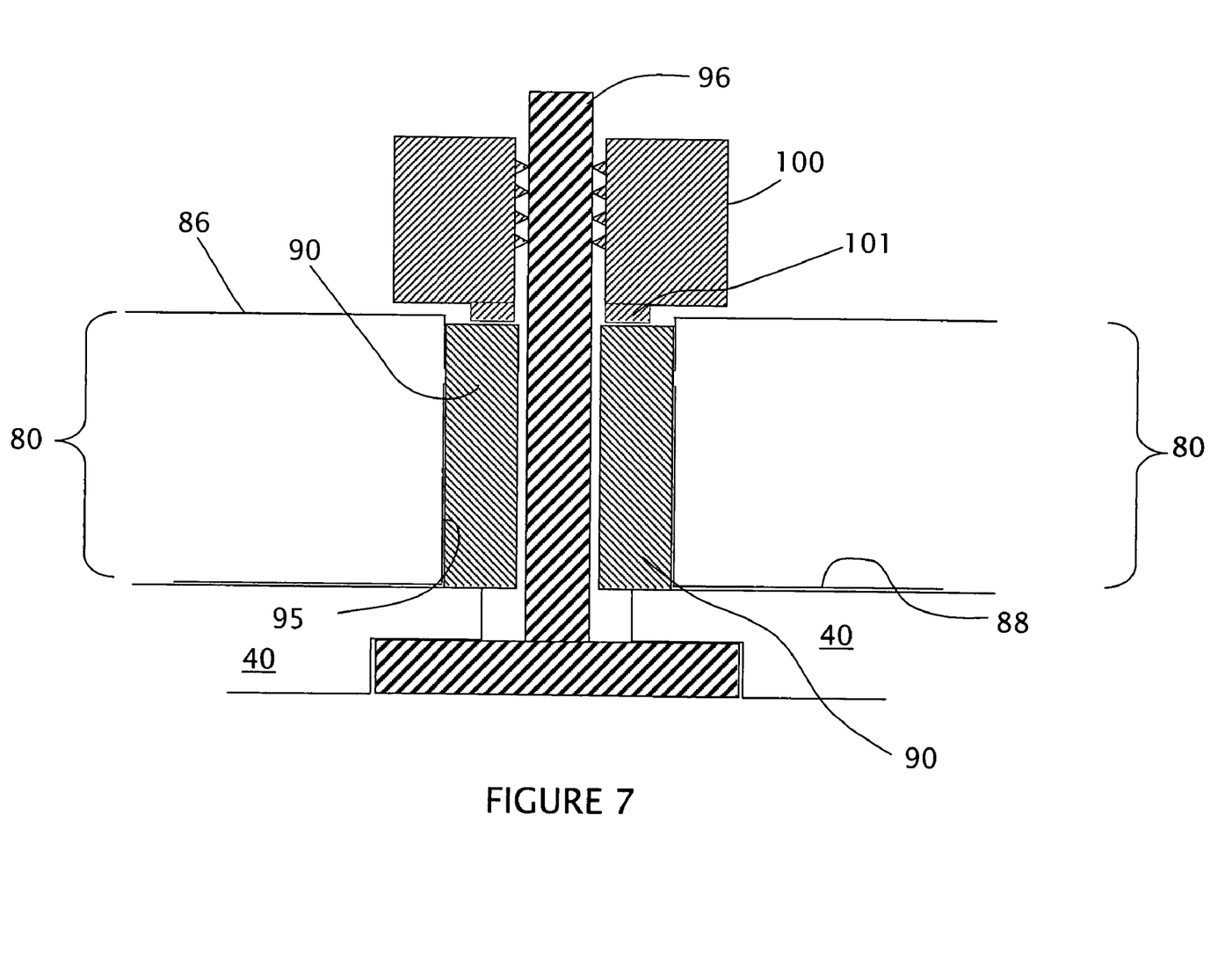
FIG. 7 is a schematic of the B+ stud, a heat sink and an alternative configuration of the stator terminal board.

Alternatively, as seen in FIG. 7, the stud aperture 95 can be formed without a stop 98. Thus, the bushing 90 can be disposed into the stud aperture 95 from the top surface 86 of the stator terminal board 80. In this construction, the bushing 90 forms the load bearing support, by either being sized to extend slightly above the top surface 86 of the stator terminal board 80 or the nut 100 can include a depending annulus 101 that that contacts the top of the bushing, thereby preventing a local crushing of the stator terminal board. In either formation, a "bottoming out" of the nut 100 occurs against the height of the bushing 90, which in turn is seated upon the positive heat sink 40, rather than against the height of the stator terminal board 80. It is further contemplated, the stator terminal board 80 can include an annular recess in the stud aperture 95 to ensure the nut 100 compresses against the bushing 90.

The stator terminal board 80 is then incorporated into the rectifier assembly 10, as the assembly is riveted together, along with a capacitor and a blade terminal housing.

In assembly, the stator terminal board 80 is riveted to the alternator housing 22 and the positive heat sink 40, as the bushing 90 is disposed within the stud aperture 95. The bushing 90 engages the positive heat sink 40 and the shoulder (stop) 98 on the stator terminal board 80 (such as the exposed portion of the embedded conductor in the stator terminal board). If the positive heat sink 40 includes an insulating coating or surface layer, such as an anodized layer, such insulating layer is preferably removed in the area of intended contact with the bushing 90.

A threaded fastener, such as a nut, coupler or connecter 100 is engaged with the threaded portion of the B+ stud 96 above the stator terminal board 80. As the fastener 100 is drawn down and contacts the top surface 86 of the stator terminal board 80 (and particularly the circular seat 97), the head of the B+ stud 96 draws the positive heat sink 40 upwards (towards the stator terminal board 80). However, as the bushing 90 extends slightly beyond the stator terminal board 80, further tightening of the fastener 100 causes a compression on bushing 90, rather than a compression of the stator terminal board 80. Thus, the bushing 90 is a load bearing element intermediate the stator terminal board 80 and the spaced positive heat sink 40, defining the local minimum distance between the stator terminal board and the positive heat sink. That is, although the stator terminal board 80 can include a plurality of stand offs 82 for spacing the stator terminal board from the positive heat sink 40, only the stand off defining the stud aperture 95 (and stop 98), are subject to the variable compressive forces of the threaded nut 100 on the B+ stud 96. Thus, the bushing 90 defines the local minimum distance between the stator terminal board 80 and the positive heat sink 40, as drawing the nut 100 down on the stator terminal board 80 only compresses the terminal board between the stop 98 and the top surface 86. The remaining stand offs 82 are only subject to the rivet process, and thus do not encounter additional post installation compression. Further, as the bottom of the bushing 90 seats on the positive heat sink 40, upward motion of the B+ stud 96 is precluded. That is, the head of the B+ stud 96 is not drawn away from the negative heat sink 20. In addition, the force taken by the bushing 90 prevents any splines on the B+ stud 96 from deforming or stripping. Similarly, the force on the bushing 90 prevents the positive heat sink 40 from separating from the negative heat sink 20.

The bushing 90 offers substantial advantages. In prior rectifiers, increased compression along the B+ stud from the fastener forced the stator terminal board toward the positive heat sink and would deform or fracture the stator terminal board. Alternatively, such prior constructions increased tightening of the nut on the B+ stud often resulted in a stripping of the threads of the B+ stud, as mechanics would tend to overtighten the fastener. Once the rectifier assembly is constructed, the bushing 90 also provides an enhanced electrical path between the positive heat sink 40 and the associated conductor of the stator terminal board 80. The bushing 90 also provides a thermal path between the positive heat sink 40 and the associated conductor of the stator terminal board 80.

Referring to FIGS. 2-5, the skeleton configuration of the stator terminal board 80 is shown, wherein the terminals 94 are separately formed from the stator terminal board and contact the stator terminal board only at spaced locations of the stator terminal board. The stator terminal board 80 includes a frame 102 having a plurality of the diode lead receiving apertures. In this construction, the frame 102 includes or defines cut outs 105 having an area substantially greater than the area of an embedded conductor. In one construction of the skeleton configuration, the cut outs 105 are greater in area than the diode lead receiving apertures 87. The cut outs 105 can define at least 25% of the area circumscribed by the stator terminal board 80, over 40% and as much as 50% or more. Typically, the upper limit of the size of the cut outs 105 relative to area of the stator terminal board 80 (or the solid area of the stator terminal board) is determined by design requirements as to strength of the stator terminal board.

In the skeleton configuration of the stator terminal board 80, the stand offs 82 are included to set the spacing between the stator terminal board and the positive heat sink 40. Typically, the skeleton configuration of the stator terminal board 80 can be formed without an embedded conductor. However, it is contemplated that selected portions of the skeleton configuration of the stator terminal board 80 can include an embedded conductor.

Figure 3:
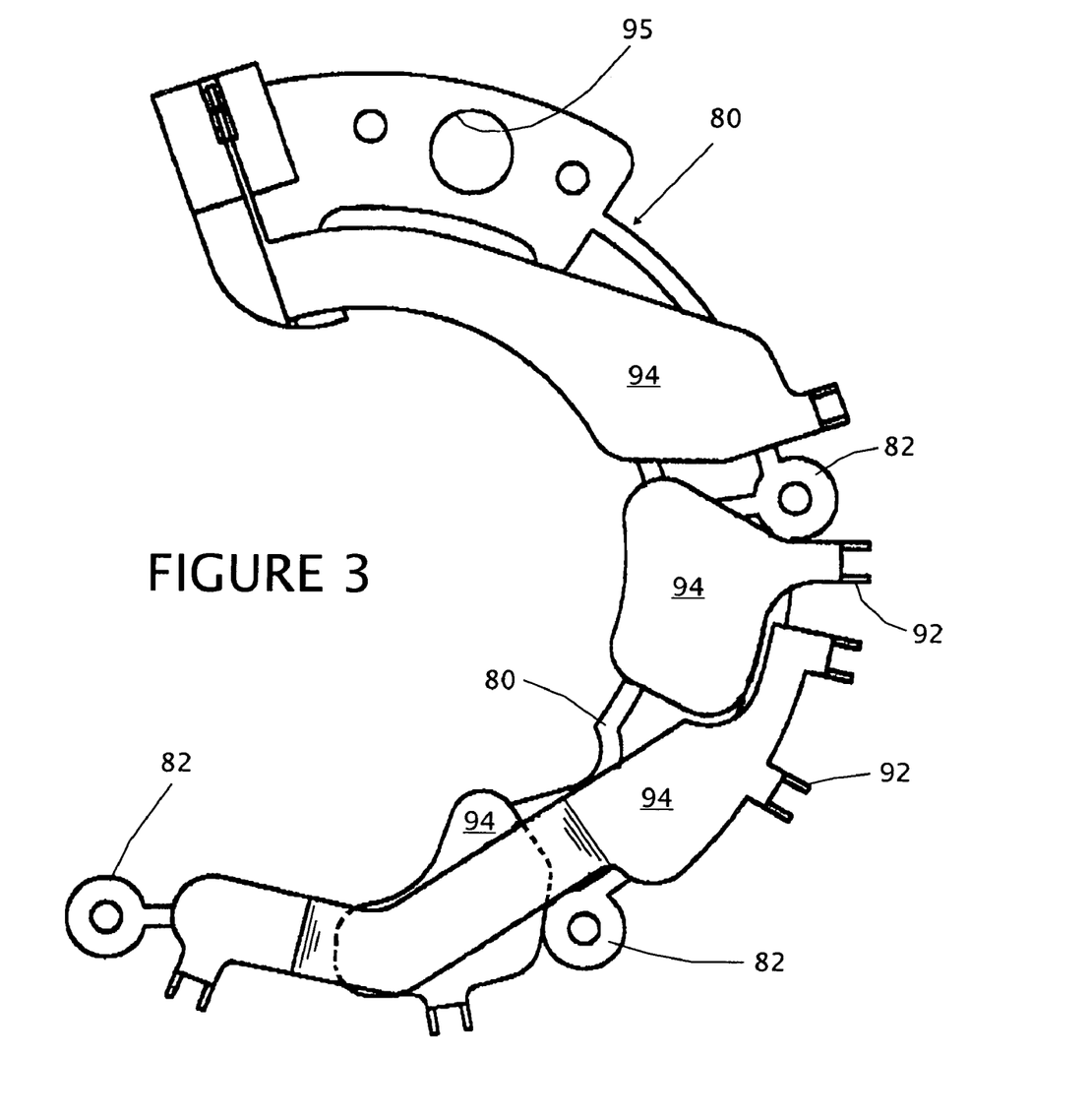
FIG. 3 is a top plan view of the stator terminal board of FIG. 2 having a plurality of connected terminals.
Figure 4:
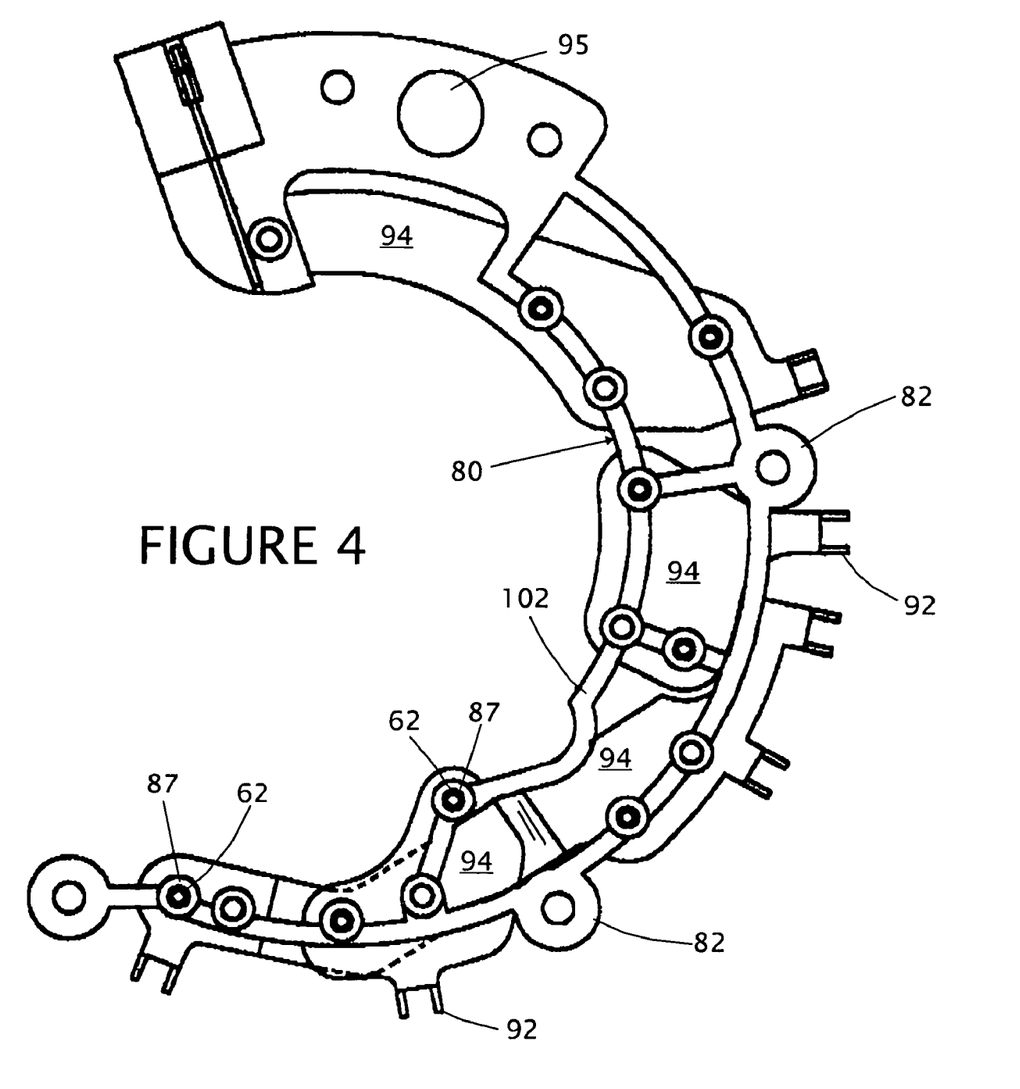
FIG. 4 is a bottom plan view of the circuit board of FIG. 2 having a plurality of connected terminals.
Figure 5:
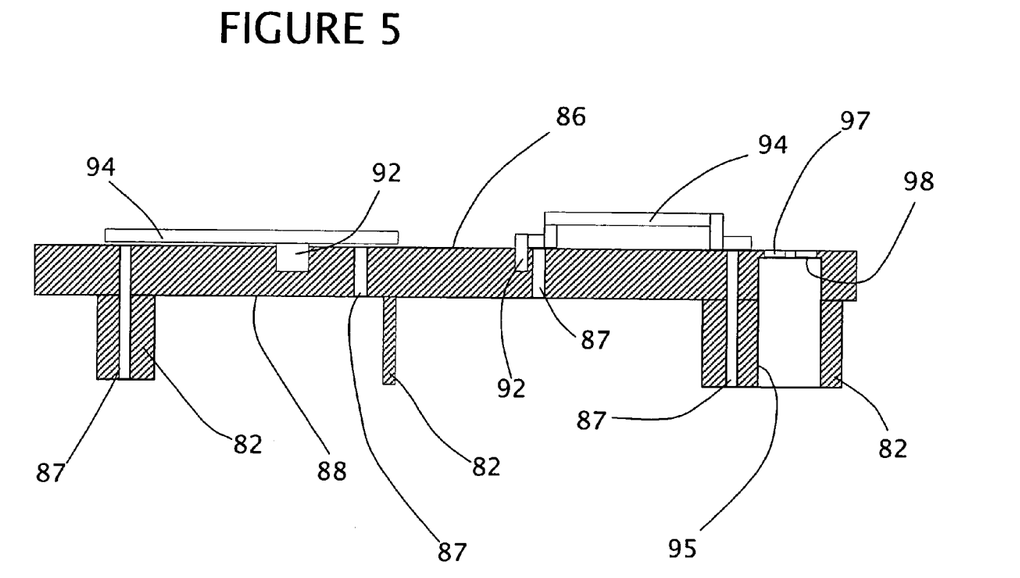
FIG. 5 is a schematic cross-section of a stator terminal board.

In this configuration, the terminals 94 are plate structures spanning the cut outs 105 in the stator terminal board 80. Thus, a majority of the surface area (on both sides) of the terminals 94 is exposed to the ambient air. As seen in FIGS. 3-5, in one configuration, at least a portion of some of the terminals 94 can be offset in a different vertical plane from the top surface 86 of the stator terminal board 80, thereby exposing increased surface area to the ambient air. That is, between approximately 1% to 50% of the terminals 94 can be contacting the stator terminal board 80, while the remaining portion is spaced from the stator terminal board. In contrast to alternative designs in which the terminals are substantially embedded within the stator terminal board 80, the exposed terminals 94 with the skeleton stator terminal board allow greater air cooling.

As seen in FIGS. 2-5, the skeleton stator terminal board 80 includes a land area sized to include the stand off 82 defining the stud aperture 95, and thereby receive the B+ stud as well as industry standard blade connector.

The stator terminal board 80 is formed of a moldable heat resistant material, polymer or resin. Satisfactory materials include thermosetting materials, including high temperature Polybutylene Terephthalate (PBT) or phenolic material. A suitable injection molding material is Valox 420, a 30% fiber glass reinforced thermoplastic from GE Plastics. Thus, the stator terminal board 80 can include non electrically conducting reinforcing materials such as fibers or a mesh embedded in the material.

Referring to FIGS. 8-11, in a further configuration of the rectifier assembly 10, radiator connectors 110 are employed to electrically connect the respective diode leads 62 above the top surface 86 of the stator terminal board 80. In this construction, embedded conductors can extend from the winding terminals to the respective diode lead aperture 87. The diode leads 62 extend through the stator terminal board 80 to terminate above the top surface 86 of the stator terminal board. The radiator connector 110 is a generally fin or vane structure to which a length of the diode leads 62 are connected, such as by solder. The diode leads 62 pass though corresponding apertures in the radiator connectors 110 and are bent to lay along an upper surface of the radiator connector. As the diode leads 62 conduct heat, it is beneficial for the diode leads to extend along a length of the radiator connector 110. Although as little as a $\frac{1}{16}^{th}$ of an inch overlap can function, it is advantageous for approximately ¼ inch to ¾ inch length of the diode lead contact the upper surface of the radiator connector 110.

Figure 8:
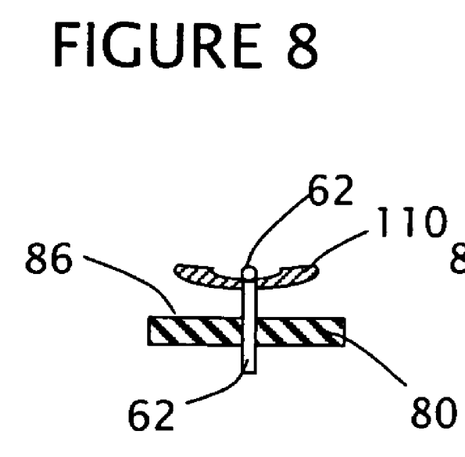
FIG. 8 is a schematic cross sectional view of a radiator connecter and diode lead relative to the stator terminal board.
Figure 9:
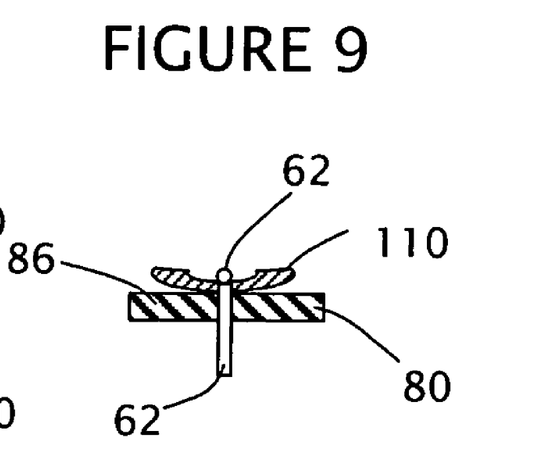
FIG. 9 is a schematic cross sectional view of an alternative location of the radiator connecter and diode lead of FIG. 8 relative to the stator terminal board.
Figure 10:
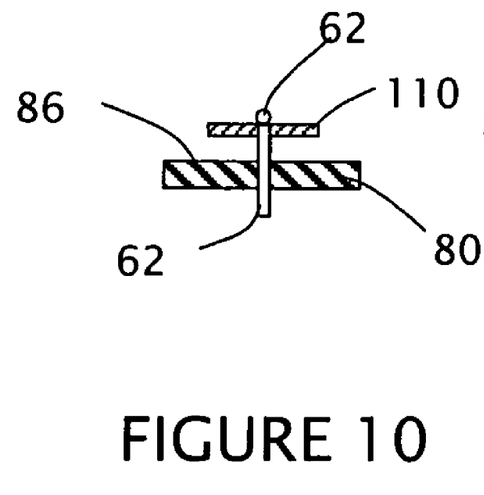
FIG. 10 is a schematic cross sectional view of an alternative construction of the radiator connecter and diode lead relative to the stator terminal board.
Figure 11:
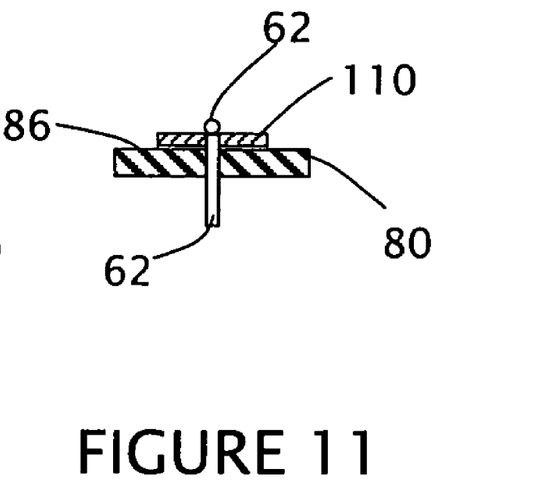
FIG. 11 is a schematic cross sectional view of an alternative location of the radiator connecter and diode lead of FIG. 10 relative to the stator terminal board.

The radiator connectors 110 can be spaced from the top surface 86 of the stator terminal board 80, thereby allowing air to circulate about all surfaces of the radiator connector to enhance heat transfer. The gap between the top surface 86 of the stator terminal board 80 and the radiator connector 110 can range from approximately $\frac{1}{64}^{th}$ of an inch to approximately $\frac{3}{16}^{th}$ of an inch. While one configuration of the rectifier assembly 10 spaces (or gaps) the radiator connectors 110 from the top surface 86 of the stator terminal board 80, it is contemplated a portion of the radiator connectors can contact the top surface of the stator terminal board. For example, as seen in FIGS. 8 and 9 the radiator connecter has curved or convex cross section. Thus, only a portion of the radiator connector 110 contacts the top surface 86 of the stator terminal board 80, thereby increasing stability of the assembly. While this configuration does not allow complete air circulation about the radiator connector 110, the construction does provide greater heat transfer than the embedded connector constructions. Alternatively, as seen in FIGS. 10 and 11, the radiator connector 110 can be a relative flat planar member, wherein one surface is adjacent to or contacting the top surface 86 of the stator terminal board 80.

In fabrication of the radiator connector 110, solder paste is disposed along each of the semiconductor (diode) leads 62 to cover the diode leads and along the associated radiator connector. The completed assembly is then passed through the solder reflow furnace to affix the leads to the radiator connectors. Alternatively, the bent diode leads 62 and associated radiator connector 110 can be locally heated to flow the solder and thermally and electrically join the leads to the radiator connector. While the solder connection provides good thermal transfer from the diode leads 62 to the associated radiator connector 110, it is understood that alternative bonding mechanisms can be employed, such as spot welding. Although the spot welding can provide a ready mechanical and electrical connection to the radiator connector 110, the associated thermal path is typically less than a soldered connection.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow.

The invention claimed is:

1. An alternator rectifier assembly comprising:
   (a) a stator terminal board having a top surface, a bottom surface and a through aperture having a stop spaced from the bottom surface;
   (b) positive heat sink spaced from the bottom surface of the stator terminal board; and
   (c) a bushing within the through aperture and contacting the stop, the bushing projecting from the stator terminal board a sufficient distance to preclude load bearing contact between the bottom surface of the stator terminal board and the positive heat sink, the stator terminal board having an embedded conductor electrically connected to the bushing.

2. An alternator rectifier assembly adapted to mount to a housing of a multiphase alternating current generator to rectify alternating current produced by the generator into direct current, the rectifier assembly comprising:
   (a) a stator terminal board having an embedded conductor;
   (b) a positive heat sink spaced from the stator terminal board; and
   (c) a bushing intermediate the positive heat sink and the stator terminal board, the bushing forming an electrical path between the embedded conductor and the positive heat sink, the bushing defining a minimum spacing between the stator terminal board and the positive heat sink.

3. The alternator rectifier assembly of claim 2, wherein the positive heat sink includes a surface coating.

4. The alternator rectifier assembly of claim 3, wherein the surface coating is insulative.

5. The alternator rectifier assembly of claim 2, wherein the bushing is brass.

6. The alternator rectifier assembly of claim 2, wherein the stator terminal board includes at least one integral stand off extending from an adjacent portion of the bottom surface, the stand off contacting the positive heat sink.

7. An alternator rectifier assembly adapted to mount to a housing of a multiphase alternating current generator to rectify alternating current produced by the generator into direct current, the rectifier assembly comprising:
   (a) a stator terminal board having a top surface, a bottom surface, a plurality of diode lead receiving apertures extending from the bottom surface to the top surface and at least one cut out;
   (b) a plurality of electrically conductive terminals connected to the top surface of the stator terminal board;
   (c) a positive heat sink spaced from the stator terminal board; and
   (d) a bushing intermediate the positive heat sink and the stator terminal board, the bushing forming an electrical path between the embedded conductor and the positive heat sink, the bushing defining a minimum spacing between the stator terminal board and the positive heat sink.

8. An alternator rectifier assembly comprising:
   (a) a stator terminal board having a top surface, a bottom surface and a through aperture having a stop spaced from the bottom surface;
   (b) positive heat sink spaced from the bottom surface of the stator terminal board; and
   (c) a bushing within the through aperture and contacting the stop, the bushing projecting from the stator terminal board a sufficient distance to preclude load bearing contact between the bottom surface of the stator terminal board and the positive heat sink, the stator terminal board having a conductor electrically connected to the bushing.

9. An alternator rectifier assembly adapted to mount to a housing of a multiphase alternating current generator to rectify alternating current produced by the generator into direct current, the rectifier assembly comprising:
   (a) a stator terminal board having a conductor;
   (b) a positive heat sink spaced from the stator terminal board; and
   (C) a bushing intermediate the positive heat sink and the stator terminal board, the bushing forming an electrical path between the conductor and the positive heat sink, the bushing defining a minimum spacing between the stator terminal board and the positive heat sink.

10. The alternator rectifier assembly of claim 9, wherein the positive heat sink includes a surface coating.

11. The alternator rectifier assembly of claim 10, wherein the surface coating is insulative.

12. The alternator rectifier assembly of claim 9, wherein the bushing is brass.

13. The alternator rectifier assembly of claim 9, wherein the stator terminal board includes at least one integral stand off extending from an adjacent portion of the bottom surface, the stand off contacting the positive heat sink.

14. An alternator rectifier assembly adapted to mount to a housing of a multiphase alternating current generator to rectify alternating current produced by the generator into direct current, the rectifier assembly comprising:
   (a) a stator terminal board having a top surface, a bottom surface, a plurality of diode lead receiving apertures extending from the bottom surface to the top surface and at least one cut out;
   (b) a plurality of electrically conductive terminals connected to the top surface of the stator terminal board;
   (c) a positive heat sink spaced from the stator terminal board; and
   (d) a bushing intermediate the positive heat sink and the stator terminal board, the bushing forming an electrical path between the conductor and the positive heat sink, the bushing defining a minimum spacing between the stator terminal board and the positive heat sink.

* * * * *

UNITED STATES PATENT AND TRADEMARK OFFICE
CERTIFICATE OF CORRECTION

PATENT NO. : 7,612,474 B2  Page 1 of 1
APPLICATION NO. : 11/314784
DATED : November 3, 2009
INVENTOR(S) : DePetris et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Nineteenth Day of October, 2010

David J. Kappos
*Director of the United States Patent and Trademark Office*